United States Patent [19]
Kim et al.

[11] Patent Number: 5,790,542
[45] Date of Patent: Aug. 4, 1998

[54] DESTINATION ADDRESS DETECTION APPARATUS FOR HARDWARE PACKET ROUTER

[75] Inventors: June-Man Kim, Kyonggi-Do; Seung-Hwan Lee, Seoul, both of Rep. of Korea

[73] Assignee: Hyundai Electronics Industries Co., Rep. of Korea

[21] Appl. No.: 671,245

[22] Filed: Jun. 27, 1996

[30] Foreign Application Priority Data

Jun. 28, 1995 [KR] Rep. of Korea .................. 95-17949

[51] Int. Cl.⁶ .................................................. H04L 12/56
[52] U.S. Cl. ............................................. 370/392; 370/417
[58] Field of Search ............................. 370/351, 401, 370/355, 356, 379, 389, 392, 397, 409, 510, 412; 364/715.11

[56] References Cited

U.S. PATENT DOCUMENTS

| | | | |
|---|---|---|---|
| 3,760,355 | 9/1973 | Bruckert | 364/715.11 |
| 4,575,818 | 3/1986 | Almy et al. | 365/49 |
| 4,730,346 | 3/1988 | Jiang | 370/510 |
| 4,829,462 | 5/1989 | Freeman et al. | 364/715.11 |
| 4,933,938 | 6/1990 | Sheehy | 370/401 |
| 5,081,654 | 1/1992 | Stephenson et al. | 375/106 |
| 5,111,453 | 5/1992 | Morrow | 370/401 |
| 5,319,764 | 6/1994 | Shimizu | 370/389 |

FOREIGN PATENT DOCUMENTS

| | | |
|---|---|---|
| 7-95244 | 9/1993 | Japan . |
| 7-264233 | 3/1994 | Japan . |

*Primary Examiner*—Benedict V. Safourek
*Assistant Examiner*—Ken Vanderpuye
*Attorney, Agent, or Firm*—Bryan Cave LLP

[57] ABSTRACT

An improved destination address detection apparatus for a hardware packet router capable of detecting the address of the destination to which the packet data is transmitted, not using the central processing unit, which includes a serial/parallel converter for converting a serial packet data inputted thereto into a parallel packet data; a buffer for storing the parallel packet data outputted from the serial/parallel converter therein and for outputting in a first-in-first-out method; an address detector for detecting an address of a destination, to which the address is transmitted, from the parallel packet data outputted from the buffer; and an "n" number of buffers, which are activated in accordance with an address of the destination detected by the address detector, for storing the packet data and for outputting in a first-in-first-out method, wherein said address detector includes an "n" number of latches, which are connected in series, for sequentially shifting the output signals of the buffer and for storing and outputting; and a decoding latch for storing and decoding the output signal of the latches, generating an "n" number of chip enable signals in accordance with an address of the destination when the address of the destination is stored, and selectively enabling the buffers.

3 Claims, 3 Drawing Sheets

DESTINATION ADDRESS DETECTION APPARATUS FOR HARDWARE PACKET ROUTER

BACKGROUND OF THE INVENTION

1. Field of the Invention

The present invention relates to a destination address detection apparatus for a hardware packet router, and particularly to an improved destination address detection apparatus for a hardware packet router which is capable of detecting a packet data and a destination address to be transmitted in a system for transmitting a control signal and predetermined data using a unit packet as in a code division multiple access system (CDMA).

2. Description of the Conventional Art

Method for transmitting predetermined data include a line switch method and a packet transmission method.

The above-mentioned line switch method which is employed in an electronic switch, is directed to not delaying the data to be transmitted and to transmitting the data at a real time by establishing a communication line.

Therefore, in order to transmit predetermined data in the line switch method, since a predetermined line occupying is necessary, the occupied communication line is not used during the occupancy of the line. In addition, the cost based on the distance varies with the distance of the communication, and it is impossible to communicate with a system having a different communication speed.

The above-mentioned packet switch method is a method which divides the data to be transmitted into a unit packet and which is used in a system for communicating a control signal or predetermined data such as in a CDMA.

In addition, in the packet data, the data to be transmitted is divided into a predetermined length and a header indicating an address of the destination is provided therein.

The packet transmission method does not occupy the line when transmitting data, so that it is possible to use the line during the communication, and it is possible to communicate with a system having a different communication speed.

A conventional packet router apparatus for searching and transmitting an address of a destination to which the packet data is transmitted such as shown in FIG. 1, includes a serial/parallel converter 100 for converting serial packet data inputted thereto into parallel packet data, a central processing unit (CPU) 110 for storing parallel packet data outputted from the serial/parallel converter 100 in an internally provided memory 111 and for searching and outputting an address for transmitting packet data, a buffer 120 for outputting the packet data outputted from the central processing unit 110 in a first-in-first-out (FIFO) method, a hardware router 130 for transmitting the packet data outputted from the buffer 120 to a corresponding destination, and an "n" number of buffers 140, 141, 142, . . . , n for outputting the packet data outputted from the hardware router 130 in the first-in-first-out method.

The operation of the conventional packet data transmission apparatus will now be explained with reference to the accompanying drawing.

To begin with, the serial packet data is converted into the parallel packet data by the serial/parallel converter 100, and the central processing unit 110 receives the thusly converted packet data and sequentially stores it in the memory 111 as a corresponding address.

The central processing unit 110 sequentially reads the parallel packet data stored in the memory 111 and detects address information among the information contained in the parallel packet data.

When a predetermined address information is detected, the central processing unit 110 converts the logical address contained in the detected address information and stores it in the buffer 120. The buffer 120 outputs the stored data in the first-in-first-out method.

The parallel packet data outputted from the buffer 120 is outputted to the hardware router 130, and then is stored in the buffer 140 or in a corresponding one among the buffers 141, 142, 143, . . . , n in accordance with a physical address and is outputted to the destination.

As described above, the conventional packet router apparatus includes the central processing unit 110 which is adapted to read the logical address of the destination from the received packet data and then convert the logical data into the physical address, thus transmitting the packet data.

Therefore, in a system which requires multitasking, the performance of the system becomes degraded due to the overload of the central processing unit 110, and when a large amount of data is inputted to the central processing unit 110, an operation error may be made due to the overload of the central processing unit 110.

SUMMARY OF THE INVENTION

Accordingly, it is an object of the present invention to provide a destination address detection apparatus for a hardware packet router, which overcomes the problems encountered in a conventional destination address detection apparatus for a hardware packet router.

It is another object of the present invention to provide an improved destination address detection apparatus for a hardware packet router capable of detecting the address of the destination to which the packet data is transmitted, not using the central processing unit.

To achieve the above objects, there is provided a destination address detection apparatus for a hardware packet router, which includes a serial/parallel converter for converting serial packet data inputted thereto into parallel packet data; a buffer for storing the parallel packet data outputted from the serial/parallel converter therein and for outputting in a first-in-first-out method; an address detector for detecting an address of a destination, to which the address is transmitted, from the parallel packet data outputted from the buffer; and an "n" number of buffers, which are activated in accordance with an address of the destination detected by the address detector, for storing the packet data and for outputting in a first-in-first-out method, wherein the address detector includes an "n" number of latches, which are connected in series, for sequentially shifting the output signals of the buffer and for storing and outputting; and a decoding latch for storing and decoding the output signal of the latches, generating an "n" number of chip enable signals in accordance with an address of the destination when the address of the destination is stored, and selectively enabling the buffers.

In this invention, a plurality of latches are connected in series, the inputted packet data are sequentially shifted and then stored. The decoding/latch decodes the packet data stored in each latch, and the address of the destination to which the packet data is transmitted is detected and then stored in the buffer of a corresponding destination in accordance with an address of the detected destination.

Therefore, since the central processing unit is not used for the detection of the address of the destination, over load is not applied to the central processing unit, thus improving the operation performance of the system, and the processing speed is made faster.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The destination address detection apparatus for a hardware packet router according to the present invention will now be described with reference to FIGS. 2 and 3.

Figure 1:
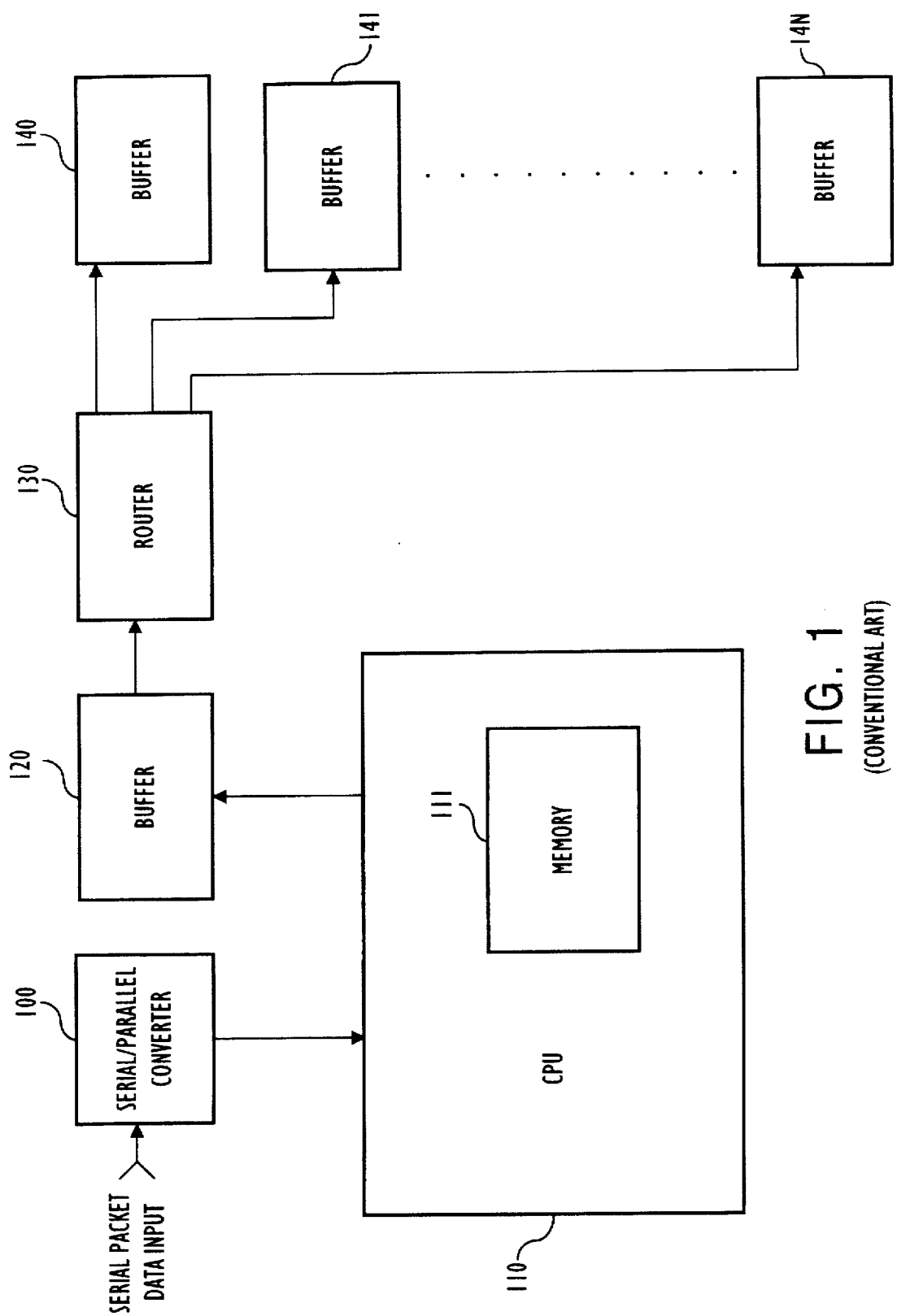
FIG. 1 is a block diagram showing the construction of a conventional address detection apparatus.
Figure 2:
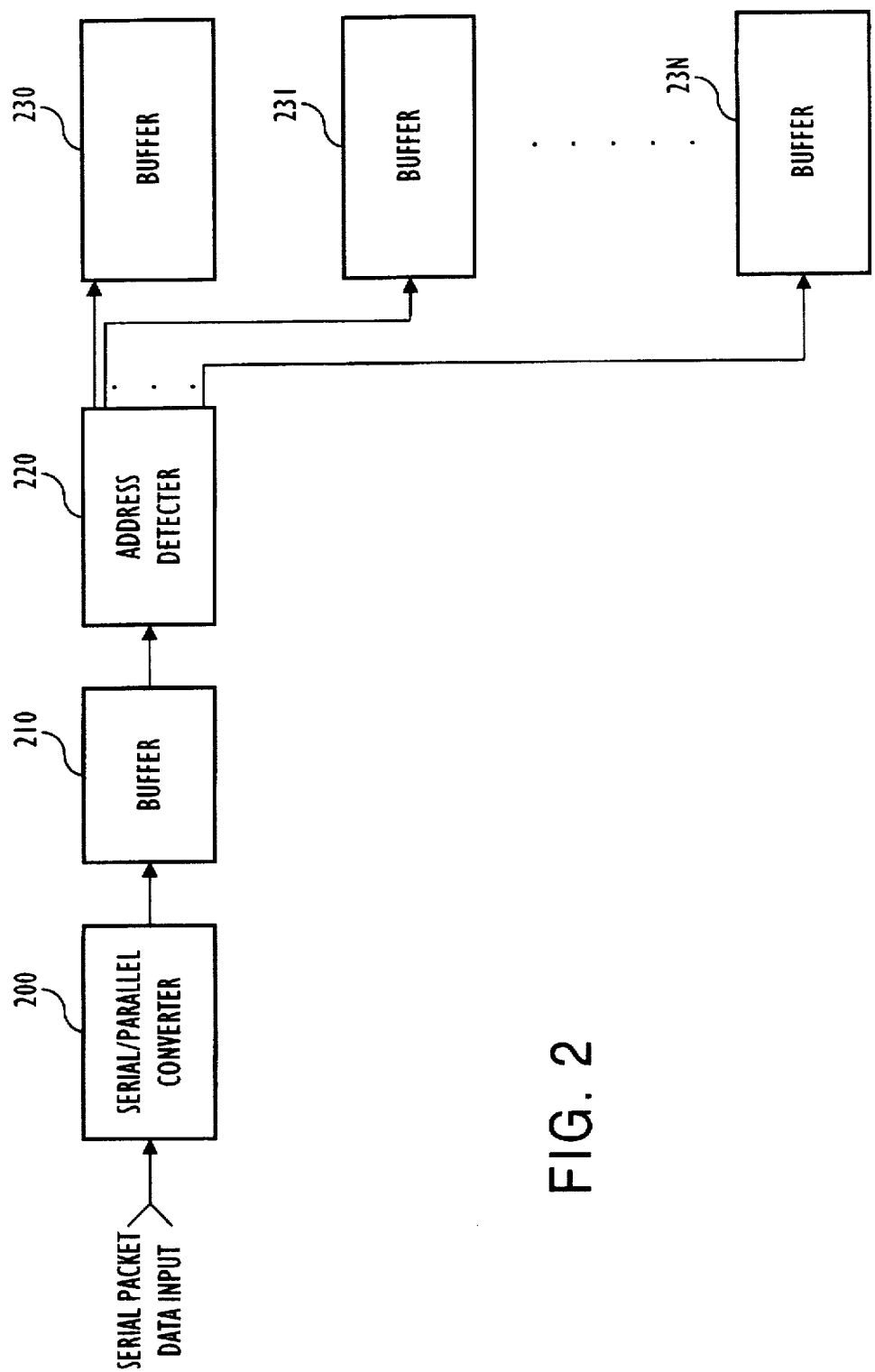
FIG. 2 is a block diagram showing the construction of an address detection apparatus according to the present invention.

FIG. 2 shows the construction of the destination address detection apparatus for a hardware packet router according to the present invention.

As shown therein, there are provided a serial/parallel converter 200 for converting a serial packet data inputted thereto into a parallel packet data, a buffer 210 for storing the parallel packet data outputted from the serial/parallel converter 200 and then for outputting in a first-in-first-out method, an address detector 220 for detecting an address of a destination from the parallel packet data outputted from the buffer 210, and an "n" number of buffers 230, 231, 232, ..., n, which are activated in accordance with an address of the destination detected by the address detector 220, for storing the packet data and then for outputting to the destination in the first-in-first-out method.

Figure 3:
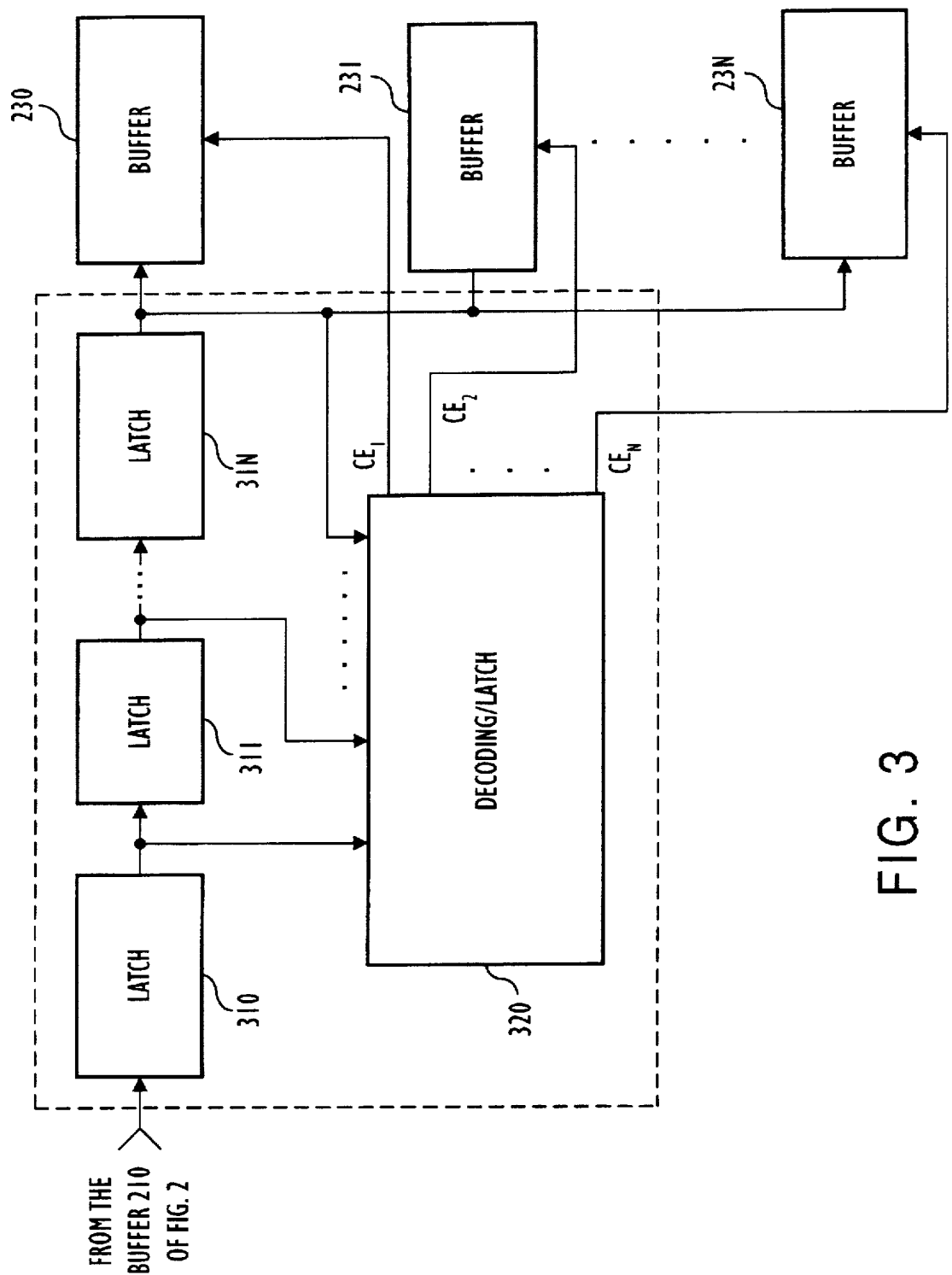
FIG. 3 is a block diagram of an address detector of FIG. 2 according to the present invention.

Here, the address detector 220, as shown in FIG. 3, includes an "n" number of latches 310, 311, ..., n which are connected in series for sequentially shifting the output signal outputted from the buffer 210 and for storing and outputting, and a decoding/latch 320 for storing and decoding the output signals of the latches 310, 311, ..., n, selectively generating chip enable signals $CE_1$, $CE_2$, ..., $CE_n$ in accordance with an address of the destination when the address of the destination in stored in the latch "n", and selectively enabling the buffers 230, 231, ..., n.

The operation of the destination address detection apparatus for a hardware packet router will now be explained with reference to the accompanying drawings.

To begin with, the present invention is basically directed to converting the serial packet data into the parallel packet data using the serial/parallel converter 200, and then the converted parallel packet data is stored in the buffer 210 in the first-in-first-out method.

The parallel packet data outputted from the buffer 210 is inputted to the address detector 220, and then the address of the destination to which the packet data is transmitted is detected. The address detector 220 selectively selects the buffers 230, 231, ..., n in accordance with the chip enable signals $CE_1$, $CE_2$, ..., $CE_n$ outputted from the address detector 220, and the packet data is stored, and is outputted in the first-in-first-out method to the destination.

Namely, the address detector 220 sequentially shifts the parallel packet data outputted from the buffer 210 to the latches 310, 311, ..., n and then stores.

The parallel packet data which is shifted and stored by the latches 310, 311, ..., n is stored in to the decoding/latch 320 and is decoded for detecting the address of the destination.

The decoding/latch 320 selectively generates chip enable signals $CE_1$, $CE_2$, ..., $CE_n$ in accordance with the address of the detected destination and then enables the buffers 230, 231, ..., n, and the enabled buffers 230, 231, ..., n store the parallel packet data outputted from the latch n and then transmit it to the destination.

As described above, the destination address detection apparatus for a hardware packet router according to the present invention is directed to detecting the destination address of the packet to be transmitted, then storing it in the buffer of the destination, and transmitting the data to the destination without using the central processing unit.

In addition, an over load is not applied to the central processing unit, thus improving the operational performance of the central processing unit. This invention can be adapted for a system requiring a high speed, multitasking, and high speed and accurate packet routing.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A destination address detection apparatus for a hardware packet router, comprising:

a serial/parallel converter for converting a serial packet data inputted thereto into a parallel packet data;

a buffer for storing the parallel packet data outputted from the serial/parallel converter therein and for outputting in a first-in-first-out method;

an address detector for detecting an address of a destination to which the parallel packet data is transmitted, from the parallel packet data outputted from the buffer; and an "n" number of buffers which are activated in accordance with an address of the destination detected by the address detector for storing the packet data and for outputting in a first-in-first-out method, said address detector comprising:

an "n" number of latches, which are connected in series, for sequentially shifting the output signals of the buffer and for storing and outputting; and a decoding latch for storing and decoding the output signal of the latches, generating an "n" number of chip enable signals in accordance with an address of the destination when the address of the destination is stored, and selectively enabling the buffers.

2. A destination address detection apparatus in accordance with claim 1 wherein said decoding latch comprises means for decoding the packet data stored in each latch.

3. A destination address detection apparatus in accordance with claim 1 wherein said address detection apparatus is operatively connected-to a central processing means and comprises means for directly transmitting the packet data to the destination detected by the address detector without said central processing means.

* * * * *